US012463406B2

(12) United States Patent
Inoue et al.

(10) Patent No.: US 12,463,406 B2
(45) Date of Patent: Nov. 4, 2025

(54) JIG

(71) Applicant: SUMITOMO WIRING SYSTEMS, LTD., Mie (JP)

(72) Inventors: Yuka Inoue, Mie (JP); Hiroaki Sakamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 377 days.

(21) Appl. No.: 18/015,188

(22) PCT Filed: Jul. 16, 2021

(86) PCT No.: PCT/JP2021/026802
§ 371 (c)(1),
(2) Date: Jan. 9, 2023

(87) PCT Pub. No.: WO2022/019232
PCT Pub. Date: Jan. 27, 2022

(65) Prior Publication Data
US 2023/0253769 A1    Aug. 10, 2023

(30) Foreign Application Priority Data
Jul. 20, 2020   (JP) ................................. 2020-123701

(51) Int. Cl.
*H02G 1/08* (2006.01)
*H02G 1/06* (2006.01)
*H02G 3/22* (2006.01)
*H02G 3/36* (2006.01)

(52) U.S. Cl.
CPC ............... *H02G 1/085* (2013.01); *H02G 1/06* (2013.01); *H02G 3/22* (2013.01); *H02G 3/36* (2013.01)

(58) Field of Classification Search
CPC ....... B25B 11/00; B25B 11/02; B25B 13/505; B25B 3/00; B25B 5/04; B25B 7/22; B25B 9/00; H02G 1/06; H02G 1/085; H02G 3/36; H02G 3/22
See application file for complete search history.

(56) References Cited

U.S. PATENT DOCUMENTS

2013/0320279 A1* 12/2013 D'Ercole ................. H02G 1/06
                                                254/134.3 R

FOREIGN PATENT DOCUMENTS

| JP | H07-032273 A | 2/1995 |
| JP | 2015-173532 A | 10/2015 |
| JP | 2019-050675 A | 3/2019 |

OTHER PUBLICATIONS

International Search Report issued on Aug. 10, 2021 for WO 2022/019232 A1 (4 pages).

* cited by examiner

*Primary Examiner* — Tyrone V Hall, Jr.
(74) *Attorney, Agent, or Firm* — Venjuris, P.C.

(57) ABSTRACT

The present invention addresses the problem of providing a jig that is capable of being easily attached and detached. A jig (21) includes a harness protective part (22) configured to be enlargeable and reduceable into shapes including an annular shape of a mounted state in which the harness protective part is mounted to cover a periphery (13a) of a through hole (13) provided in a panel (11). The jig (21) includes a pair of tab operating parts (23) for deforming the harness protective part (22) to a reduced state side.

8 Claims, 3 Drawing Sheets

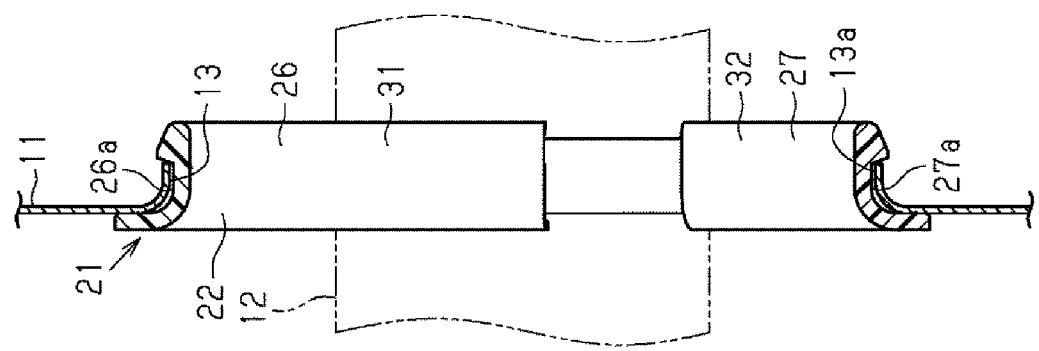
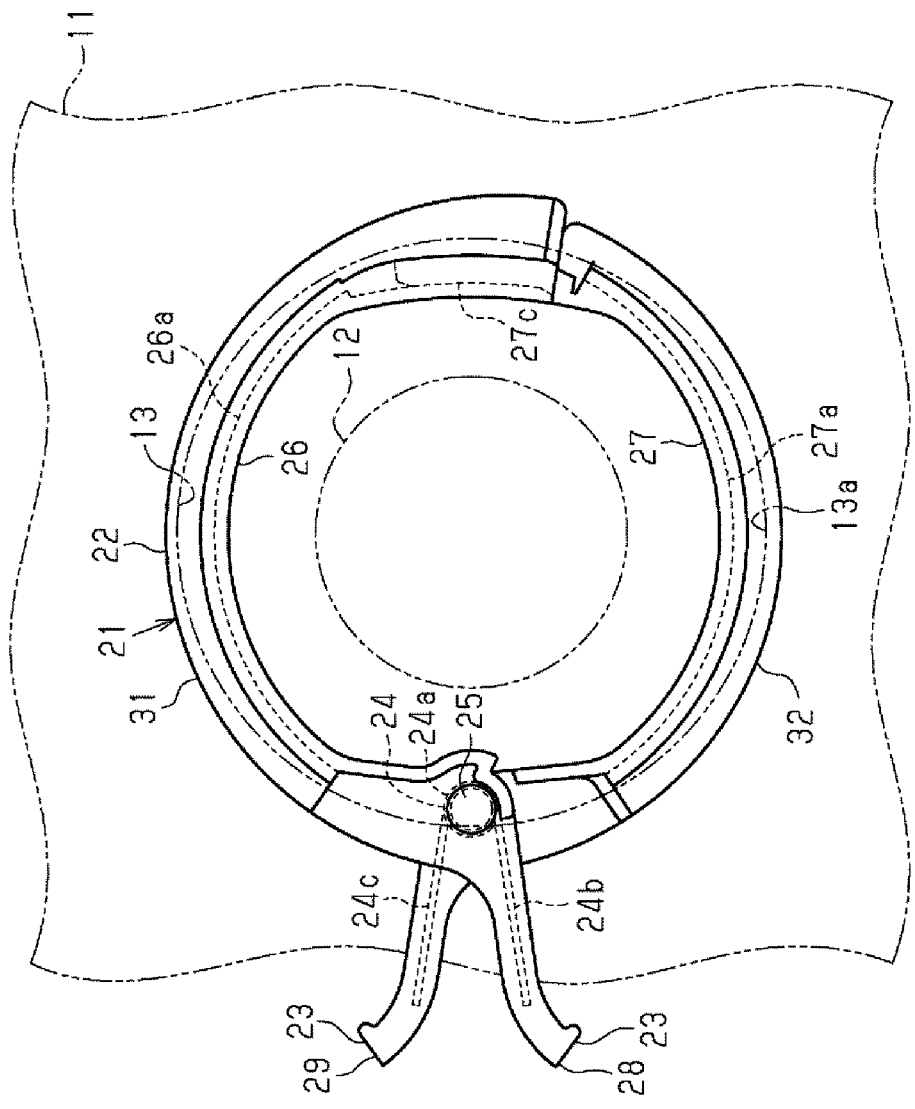

JIG

CROSS REFERENCE TO RELATED APPLICATIONS

This application is a national phase of PCT application No. PCT/JP2021/026802, filed on 16 Jul. 2021, which claims priority from Japanese patent application No. 2020-123701, filed on 20 Jul. 2020, all of which are incorporated herein by reference.

TECHNICAL FIELD

The present disclosure relates to a jig.

BACKGROUND

Conventionally, when performing the task of passing a wire harness through a through hole provided in a panel of a vehicle, a sheet called magic pile is wrapped around the wire harness, in order to prevent the wire harness being damaged by rubbing on the edge or burrs of the periphery of the through hole. However, when magic pile is used, the processes of wrapping and removing and then collecting and reusing the magic pile are troublesome and increase costs.

In view of this, when performing the task of passing a wire harness through a through hole, it has been proposed that rather than using magic pile, a jig be mounted to the periphery of the through hole instead (e.g., see, Patent Document 1). This jig is formed in a trumpet shape in which a circumferential portion is cut out, and the outer shape is configured to be enlargeable and reduceable by changing the overlapping amount (i.e., the size of the overlap). A portion of this trumpet-shaped jig on the small diameter side is provided with latching claws that protrude radially outward. By increasing the overlapping amount and reducing the outer shape of the jig, it becomes possible to pass the region where the latching claws are provided through the through hole, enabling the jig to be attached to and detached from the periphery of the through hole.

PRIOR ART DOCUMENT

Patent Document

Patent Document 1: JP 2015-173532 A

SUMMARY OF THE INVENTION

Problems to be Solved

However, with a jig such as described above, when reducing the outer shape of the jig by increasing the overlapping amount, it is, for example, necessary to compress the trumpet-shaped jig while squeezing the outer circumferential surface thereof, requiring the technician to use both hands, and this and other issues means that there is room for improvement in terms of workability at the time of attachment and detachment.

The present invention has been made in order to solve the above problem, and an object of the invention is to provide a jig that is capable of being easily attached and detached.

Means to Solve the Problem

The jig of the present disclosure is a jig including a harness protective part configured to be enlargeable and reduceable into shapes including an annular shape of a mounted state in which the harness protective part is mounted to cover a periphery of a through hole provided in a panel, the jig including a pair of tab operating parts for deforming the harness protective part to a reduced state side.

Effect of the Invention

According to the jig of the present disclosure, easy attachment and detachment becomes possible.

BRIEF DESCRIPTION OF THE DRAWINGS

FIG. 2 is a cross-sectional view of the panel and the jig in one embodiment.

FIG. 3 is a rear view for describing deformation of the jig in one embodiment.

DETAILED DESCRIPTION TO EXECUTE THE INVENTION

Figure 1:
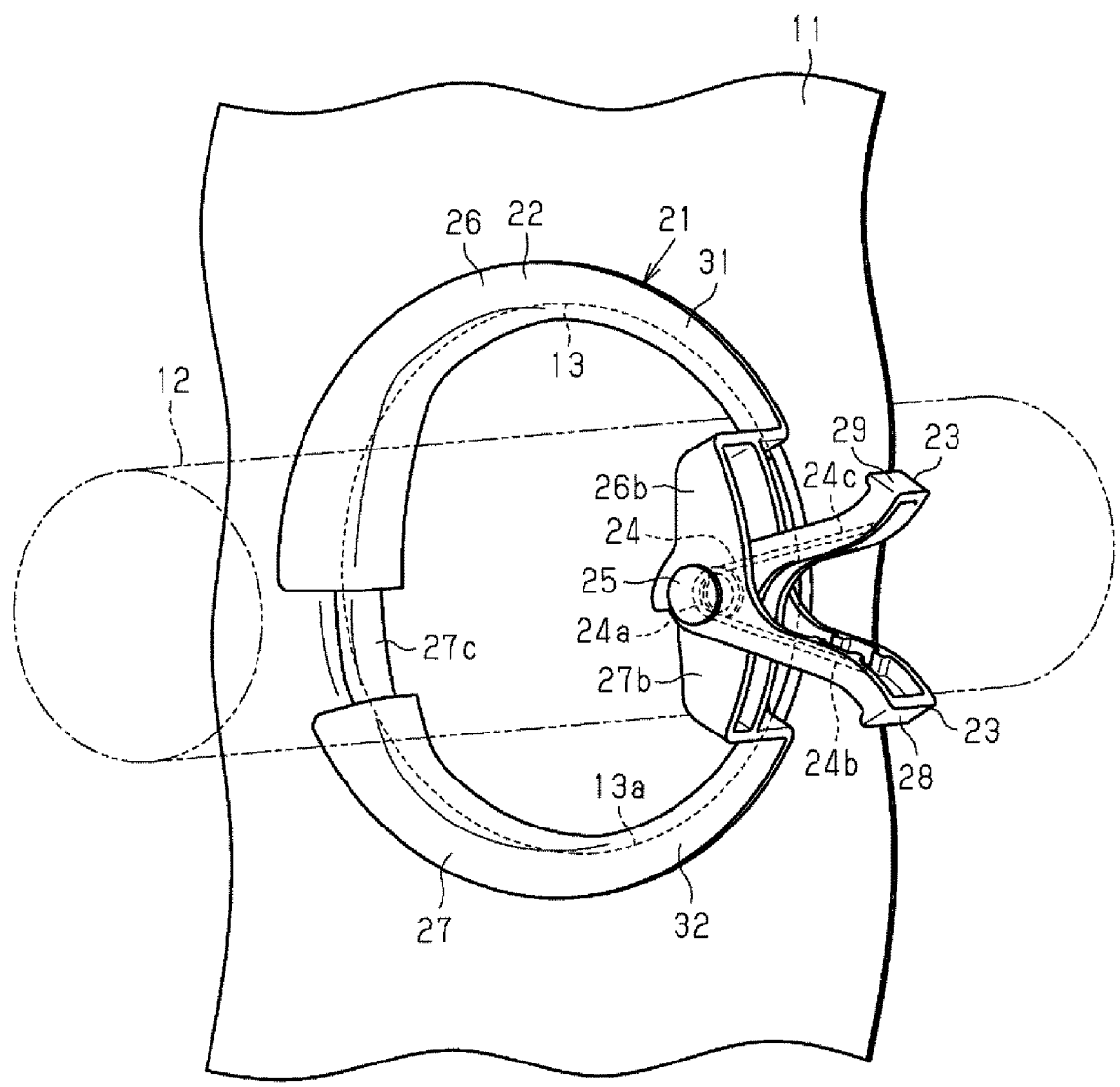
FIG. 1 is a perspective view of a panel and a jig in one embodiment.

Initially, modes of the present disclosure will be enumerated and described.

A jig of the present disclosure is: [1] a jig including a harness protective part configured to be enlargeable and reduceable into shapes including an annular shape of a mounted state in which the harness protective part is mounted to cover a periphery of a through hole provided in a panel, the jig including a pair of tab operating parts for deforming the harness protective part to a reduced state side (i.e., such that the outer shape of the harness protective part becomes smaller). The harness protective part is, in other words, constituted such that the external shape thereof is enlargeable and reduceable, and to be mountable in the through hole so as to cover the periphery of the through hole around its entire circumference.

According to this configuration, a pair of tab operating parts for deforming the harness protective part to the reduced state side are provided, thus enabling the technician to easily deform the harness protective part to the reduced state side by operating the pair of tab operating parts, and facilitating attachment and detachment of the jig with respect to the periphery of the through hole.

[2] Preferably, the jig further includes a spring member assembled so as to bias the harness protective part to an enlarged state side (i.e., so as to bias the harness protective part such that the outer shape of the harness protective part becomes larger).

According to this configuration, the jig includes a spring member assembled so as to bias the harness protective part to the enlarged state side, thus enabling the harness protective part to be strongly and stably brought in pressing contact with the periphery of the through hole, and enabling the jig to be mounted firmly and stably.

[3] Preferably, the harness protective part includes a first protective part and a second protective part that turn relative to each other about a shaft part.

According to this configuration, the harness protective part includes a first protective part and a second protective part that turn relative to each other about the shaft part, thus enabling the shape of the harness protective part to be stabilized, compared to the case where, for example, the harness protective part is configured to enlarge and reduce by elastically deforming as a whole.

[4] Preferably, the pair of tab operating parts include a first tab part extending from a region of the first protective part that corresponds to the shaft part, and a second tab part extending from a region of the second protective part that corresponds to the shaft part, and a first component having the first protective part and the first tab part and a second component having the second protective part and the second tab part are coupled together so as to intersect each other at the shaft part.

According to this configuration, the first component having the first protective part and the first tab part and the second component having the second protective part and the second tab part are coupled together so as to intersect each other at the shaft part, and thus when the tab operating parts are held such that the first tab part and the second tab part approach each other, the harness protective part can be made to deform to the reduced state side due to the first tab part and the second tab part approaching each other.

[5] Preferably, distal end portions of the first protective part and the second protective part are set to separate from each other when an external force is not applied.

According to this configuration, the distal end portions of the first protective part and the second protective part are set to separate from each other when an external force is not applied, thus enabling the jig to be easily removed from the wire harness that has been passed through the through hole. That is, the jig can be disengaged from the wiring harness that has been passed through the through hole simply by moving the jig in a direction orthogonal to the longitudinal direction of the wire harness.

DETAILED DESCRIPTION OF EMBODIMENTS OF DISCLOSURE

Specific examples of the jig of the present disclosure will be described below with reference to the drawings. Note that the present invention is not limited to these illustrative examples and is defined by the claims, and all changes that come within the meaning and range of equivalency of the claims are intended to be embraced therein.

[Configuration of Panel 11]

As shown in FIGS. 1 and 2, a through hole 13 for passing a wire harness 12 through is provided in a panel 11 provided in a vehicle. Note that the through hole 13 of the present embodiment is formed by a burring process in a cylindrical shape in which a periphery 13a extends in the direction in which the through hole 13 passes through the panel 11.

[Configuration of Jig 21]

The jig 21 is mounted to the periphery 13a, in order to prevent the wire harness 12 from being damaged by rubbing against the edge or burrs of the periphery 13a, when performing the task of passing the wire harness 12 through the through hole 13.

The jig 21 includes a harness protective part 22 configured to be enlargeable and reduceable into shapes including an annular shape of a mounted state in which the harness protective part 22 is mounted to cover the periphery 13a of the through hole 13, a pair of tab operating parts 23 for deforming the harness protective part 22 to the reduced state side (i.e., such that the outer shape of the harness protective part 22 becomes smaller), and a spring member 24 assembled so as to bias the harness protective part 22 to the enlarged state side (i.e., the harness protective part 22 is biased such that the outer shape of the harness protective part 22 becomes larger).

To be more specific, the harness protective part 22 includes a first protective part 26 and a second protective part 27 that turn relative to each other about a shaft part 25. Also, the pair of tab operating parts 23 include a first tab part 28 extending from a region of the first protective part 26 that corresponds to the shaft part 25, and a second tab part 29 extending from a region of the second protective part 27 that corresponds to the shaft part 25.

The first protective part 26 and the second protective part 27 are formed to have a substantially circular arc shape that corresponds to the periphery 13a of the through hole 13.

As shown in FIG. 2, recess parts 26a and 27a capable of covering the periphery 13a of the through hole 13 are provided on the outer periphery of the first protective part 26 and the second protective part 27. Also, the inner circumferences of the first protective part 26 and the second protective part 27 are formed to have a smooth shape without edges such that the wire harness 12 that is passed therethrough is not damaged.

As shown in FIG. 1, bulge parts 26b and 27b that bulge in the axial direction are respectively provided on the base end side of the first protective part 26 and the second protective part 27. Due to the shaft part 25 provided to pass through the bulge parts 26b and 27b, the first protective part 26 and the second protective part 27 are capable of turning relative to each other about this shaft part 25.

A first tab part 28 is outward from the bulge part 26b of the first protective part 26, and, specifically, extends radially outward with respect to the circular arc that is formed by the first protective part 26. A second tab part 29 is outward from the bulge part 27b of the second protective part 27, and, specifically, extends radially outward with respect to the circular arc formed by the second protective part 27.

A first component 31 having the first protective part 26 and the first tab part 28 and a second component 32 having the second protective part 27 and the second tab part 29 are coupled together so as to intersect each other at the shaft part 25. Note that the first component 31 and the second component 32 are both formed with a resin material.

The spring member 24 is a torsion coil spring having a coil part 24a that is fitted onto the shaft part 25 and two end portions 24b and 24c that are respectively latched onto the first tab part 28 and the second tab part 29. The spring member 24 biases the first tab part 28 and the second tab part 29, so as to separate the first tab part 28 and the second tab part 29, or in other words, such that the angle formed at the shaft part 25 by the first tab part 28 and the second tab part 29 increases. Due to this configuration and to the first component 31 and the second component 32 being coupled together in an intersecting manner as described above, the spring member 24 biases the harness protective part 22 constituted by the first protective part 26 and the second protective part 27, so as to separate the first protective part 26 and the second protective part 27, or in other words, to the enlarged state side (i.e., such that the outer shape of the harness protective part 22 becomes larger). For example, when the pair of tab operating parts 23 of the jig 21 are operated by the technician against the biasing force of the spring member 24, that is, specifically, when the first tab part 28 and the second tab part 29 are held so as to approach each other, and the harness protective part 22 deforms to the reduced state side (i.e., such that the outer shape of the harness protective part 22 becomes smaller), that is, specifically, the first protective part 26 and the second protective part 27 turn so as to approach each other.

Figure 4:
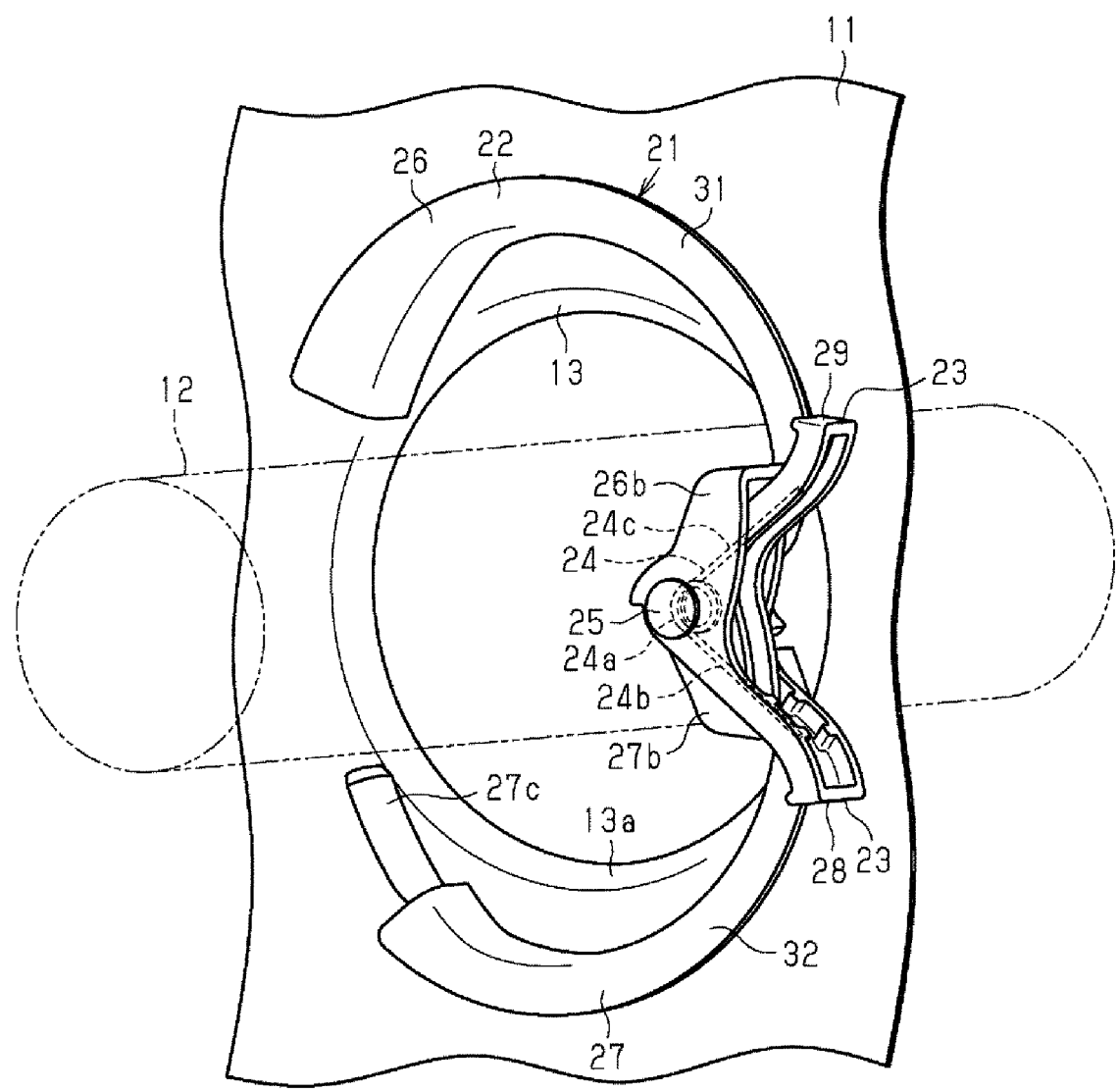
FIG. 4 is a perspective view for describing deformation of the jig in one embodiment.

As shown in FIG. 4, the jig 21 is in the enlarged state in which the harness protective part 22 is enlarged to its largest (i.e., the outer shape of the harness protective part 22 is maximized), when an external force is not applied, that is, specifically, when the tab operating parts 23 are not operated and the jig 21 is not mounted to the periphery 13a of the through hole 13, and is set such that the distal end portions of the first protective part 26 and the second protective part 27 separate from each other in this enlarged state. The distal end portion of the second protective part 27 has a displaced distal end portion 27c that is displaced radially outward with respect to the circular arc of the second protective part 27 and extends circumferentially. The displaced distal end portion 27c is formed so as to overlap the first protective part 26 on the radially outer side partway through the harness protective part 22 deforming from the enlarged state (see FIG. 4) to the reduced state in which the harness protective part 22 is reduced to its smallest (i.e., the outer shape of the harness protective part 22 is minimized (see FIG. 3)).

Next, the operation of the jig 21 configured as above will be described.

First, as shown in FIG. 3, before passing the wire harness 12 through the through hole 13, the technician operates the pair of tab operating parts 23, that is, specifically, holds the first tab part 28 and the second tab part 29 with his or her thumb and index finger, for example, and deforms the harness protective part 22 into the reduced state (i.e., the outer shape of the harness protective part 22 is deformed to its smallest), and the regions of the harness protective part 22 that correspond to the recess parts 26a and 27a are inserted to the inner side of the through hole 13.

Next, as shown in FIGS. 1 and 2, the technician releases operation of the pair of tab operating parts 23, that is, specifically, relaxes his or her thumb and index finger, for example, that are holding the pair of tab operating parts 23, such that the first tab part 28 and the second tab part 29 separate, to deform the harness protective part 22 to the enlarged state side (i.e., such that the outer shape of the harness protective part 22 becomes larger), and house the periphery 13a of the through hole 13 in the recess parts 26a and 27a such that the jig 21 is mounted.

Next, the technician passes the wire harness 12 through the through hole 13 to which the jig 21 is mounted. At this time, in cases where the wire harness 12 would otherwise come in contact with the periphery 13a of the through hole 13, the periphery 13a is covered by the harness protective part 22, and thus the wire harness 12 is prevented from coming in contact with the edge or burrs of the periphery 13a.

Next, as shown in FIGS. 3 to 4, the technician again operates the pair of tab operating parts 23 to deform the harness protective part 22 into the reduced state (i.e., to deform the harness protective part 22 such that the outer shape thereof is minimized), and removes the harness protective part 22 from the periphery 13a of the through hole 13, and, thereafter, releases operation of the pair of tab operating parts 23 to deform the harness protective part 22 into the enlarged state (i.e., to deform the harness protective part 22 such that the outer shape thereof is maximized).

The technician then moves the jig 21 with respect to the wire harness 12 in a direction orthogonal to the longitudinal direction of the wire harness 12, such that the wire harness 12 passes between the distal end portions of the first protective part 26 and the second protective part 27, disengaging the jig 21 from the wire harness 12 and completing the task.

Next, the effects of the above embodiment will be described below.

(1) Since the jig 21 is provided with the pair of tab operating parts 23 for deforming the harness protective part 22 to the reduced state side, the technician is able to easily deform the harness protective part 22 to the reduced state side by operating the pair of tab operating parts 23, facilitating attachment and detachment of the jig 21 with respect to the periphery 13a of the through hole 13.

(2) Since the jig 21 is provided with the spring member 24 assembled so as to bias the harness protective part 22 to the d state side, it becomes possible to strongly and stably bring the harness protective part 22 in pressing contact with the periphery 13a of the through hole 13, and to firmly and stably mount the jig 21.

(3) Since the harness protective part 22 includes the first protective part 26 and the second protective part 27 that turn relative to each other about the shaft part 25, the harness protective part 22 can be formed in a stable shape, compared to the case where, for example, the harness protective part is configured to enlarge and reduce by elastically deforming as a whole.

(4) The first component 31 having the first protective part 26 and the first tab part 28 and the second component 32 having the second protective part 27 and the second tab part 29 are coupled together so as to intersect each other at the shaft part 25. Therefore, when the tab operating parts 23 are held such that the first tab part 28 and the second tab part 29 approach each other, the harness protective part 22 can be made to deform to the reduced state side due to the first protective part 26 and the second protective part 27 approaching each other.

(5) Since the distal end portions of the first protective part 26 and the second protective part 27 are set to separate from each other when an external force is not applied, the jig 21 can be easily removed from the wire harness 12 that has been passed through the through hole 13. That is, the jig 21 can be disengaged from the wiring harness 12 that has been passed through the through hole 13 simply by moving the jig 21 with respect to the wire harness 12 in a direction orthogonal to the longitudinal direction of the wire harness 12.

The present embodiment can be implemented in a modified manner as follows. The present embodiment and the following example modifications can be implemented in combination so long as there are no technical inconsistencies.

In the above embodiment, the jig 21 includes the spring member 24 assembled so as to bias the harness protective part 22 to the enlarged state side, but the present disclosure is not limited thereto, and a configuration may be adopted in which, for example, the spring member 24 is not provided and the harness protective part is formed as an integrally molded article that elastically deforms as a whole. Specifically, for example, the harness protective part may be constituted as an integrally molded article in which an annular circumferential portion is cut out, and the outer shape is configured to be enlargeable and reduceable by changing the overlapping amount (i.e., the size of the overlap). A jig may then be constituted in which this harness protective part is provided with a pair of tab operating parts for deforming the harness protective part to the reduced state side.

In the above embodiment, a torsion coil spring is used for the spring member 24, but another spring member such as a compression spring or a leaf spring may be used instead, as long as this other spring member operates in a similar manner In the above embodiment, the jig 21 is set such that the distal end portions of the first protective part 26 and the second protective part 27 separate from each other when an external force is not applied, but the present disclosure is not limited thereto, and the distal end portions of the first protective part 26 and the second protective part 27 may be set so as to not separate from each other. Note that, in this case, for example, the jig 21 is removed from the wire harness 12 that has been passed through the through hole 13 by moving the jig 21 with respect to the wire harness 12 to an end portion of the wire harness 12 in the longitudinal direction.

In the above embodiment, although not particularly referred to, the interval between the first tab part 28 and the second tab part 29 in a state where these tab parts are most separated is preferably an interval that the technician can achieve with one-handed operation, such as several centimeters, for example.

LIST OF REFERENCE NUMERALS

11 Panel
12 Wire harness
13 Through hole
13a Periphery
21 Jig
22 Harness protective part
23 Tab operating part
24 Spring member
24a Coil part
24b, 24c End portion
25 Shaft part
26 First protective part
26a Recess part
26b Bulge part
27 Second protective part
27a Recess part
27b Bulge part
27c Displaced distal end portion
28 First tab part
29 Second tab part
31 First component
32 Second component

What is claimed is:

1. A jig comprising:
a harness protective part configured to be enlargeable and reduceable between an enlarged state and a reduced state, the harness protective part including:
a first protective part having a first recess part;
and a second protective part having a second recess part,
wherein the first protective part and the second protective part are configured to turn relative to each other about a shaft part, and
wherein, in a mounted state, the first recess part and the second recess part together receive and cover at least a part of a periphery of a through hole provided in a panel such that the harness protective part forms an annular shape, and
a pair of tab operating parts coupled to the harness protective part and configured for deforming the harness protective part to a reduced state side.

2. The jig according to claim 1, further comprising:
a spring member assembled so as to bias the harness protective part to an enlarged state side.

3. The jig according to claim 1,
wherein the pair of tab operating parts include a first tab part extending from a region of the first protective part that corresponds to the shaft part, and a second tab part extending from a region of the second protective part that corresponds to the shaft part, and
a first component having the first protective part and the first tab part and a second component having the second protective part and the second tab part are coupled together so as to intersect each other at the shaft part.

4. The jig according to claim 1,
wherein distal end portions of the first protective part and the second protective part are set to separate from each other when an external force is not applied.

5. The jig according to claim 1, further comprising a torsion coil spring having a coil part fitted onto the shaft part and two end portions acting between the pair of tab operating parts so as to bias the harness protective part towards the enlarged state.

6. The jig according to claim 1, wherein distal end portions of the first protective part and the second protective part are configured to separate from each other when an external force is not applied to the pair of tab operating parts.

7. The jig according to claim 6, wherein the distal end portion of the second protective part includes a displaced distal end portion configured to overlap the first protective part on a radially outer side when the harness protective part is deformed towards the reduced state.

8. The jig according to claim 1, wherein inner circumferences of the first protective part and the second protective part are formed to have a smooth shape with rounded edges.

* * * * *